(12) United States Patent
Kaku et al.

(10) Patent No.: US 6,356,507 B1
(45) Date of Patent: Mar. 12, 2002

(54) SYNCHRONOUS DRAM USING COLUMN OPERATION SYCHRONOUS PULSES WHICH ARE DIFFERENT BETWEEN READ AND WRITE

(75) Inventors: Mariko Kaku; Munehiro Yoshida, both of Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/665,961

(22) Filed: Sep. 21, 2000

(30) Foreign Application Priority Data

Sep. 22, 1999 (JP) ............................. 11-268359

(51) Int. Cl.$^7$ ................................. G11C 8/00
(52) U.S. Cl. ........................ 365/233; 365/194
(58) Field of Search ................... 365/233, 194

(56) References Cited

U.S. PATENT DOCUMENTS 5,841,717 A * 11/1998 Yamaguchi ............... 365/205

6,130,856 A * 10/2000 McLaury ................. 365/233

FOREIGN PATENT DOCUMENTS

| JP | 10-283779 | 10/1998 |
| JP | 11-224486 | 8/1999 |

* cited by examiner

Primary Examiner—Richard Elms
Assistant Examiner—VanThu Nguyen
(74) Attorney, Agent, or Firm—Finnegan, Henderson, Farabow, Garrett, & Dunner, L.L.P.

(57) ABSTRACT

To provide a semiconductor memory for synchronizing input of a command except for POWER-DOWN-EXIT or the like and write or read of data with an external clock and generating a column operation synchronous pulse having the same number as that of a burst length within the semiconductor memory by using an internal operation synchronous pulse having this external clock as a trigger and after activation of a column system circuit, using the internal operation synchronous pulse as a trigger. This semiconductor memory uses column pulse transfer signals, which are different between read and write to control a column system circuit.

18 Claims, 10 Drawing Sheets

SYNCHRONOUS DRAM USING COLUMN OPERATION SYCHRONOUS PULSES WHICH ARE DIFFERENT BETWEEN READ AND WRITE

CROSS-REFERENCE TO RELATED APPLICATIONS

This application is based upon and claims the benefit of priority from the prior Japanese Patent Application No. 11-268359, filed Sep. 22, 1999, the entire contents of which are incorporated herein by reference.

BACKGROUND OF THE INVENTION

The present invention relates to a semiconductor memory, for example, a semiconductor memory to synchronize input of a command and write or read of data with an external clock, such as a synchronous DRAM.

In the case of semiconductor memory which synchronizes input of a command and write or read of data with an external clock, the operation of circuits in a chip is synchronized with some basic pulses, which are generated within the chip by using the external clock as a trigger. In such a semiconductor memory, an access time from input of read command to data output is determined by the number of pulses in the external synchronous clock. For example, in a synchronous DRAM, the number of the pulses in the external synchronous clock is called as CAS latency (CL) and it is important value for a specification. A column operation synchronous pulse, which is synchronized with the operation of the column system circuit within a chip, is generated at a timing to fill this value. Further, the timing of this column operation synchronous pulse is usually determined uniquely by the above CL. The same pulse can be used even if a column command represents "read" or "write", since the pulse control is advantageously simplified when the column operation synchronous pulses of read and write are identical.

FIGS. 1 to 3 illustrate the above described conventional semiconductor memory, respectively. FIG. 1 is a block diagram showing extractively a circuit in reference to the control of a column system basic pulse in the synchronous DRAM. FIG. 2 is a circuit diagram showing a constitutional example of an input column address latch controller in the circuit shown in FIG. 1. FIG. 3 is a circuit diagram showing a column pulse transfer controller in the circuit shown in FIG. 1.

As shown in FIG. 1, a circuit in reference to the control of the column system basic pulse in the synchronous DRAM comprises an external clock input buffer 11, pulse generators 12-1, 12-2, 13-1, 13-2, delay circuits 14-1, 14-2, a CAS input buffer 15, a RAS input buffer 16, a CS input buffer 17, a decoder 18, a decoder and latch circuit 19, a WE input buffer 20, an input column address latch controller 21, address input buffers 22-1, 22-2 (ADD1, ADD2), address latches 23-1, 23-2, core buses 24-1, 24-2 (addresses K1, K2), a burst length counter 25, a column pulse transfer controller 26, a column bank controller 27, a DQ buffer 28, a data line 29, an off chip driver 30, an output pulse generator 31, transfer gates 32-1 to 32-7, 32-9 to 32-12, a column address decoder 33, a memory cell allay 34 and an inverter 35 or the like.

As shown in FIG. 2, the above column address latch controller 21 is composed of a NAND gate 41, a transfer gate 42 and inverters 43, 44, 45.

Further, as shown in FIG. 3, the above column pulse transfer controller 26 is composed of a NOR gate 51, transfer gates 52 to 54 and inverters 55 to 60. A signal CL2OPN controls the transfer gate 52 to open the transfer gate 52 when the CAS latency is 2. A signal CL3OPN controls the transfer gate 53 to open the transfer gate 52 when the CAS latency is 3.

In FIGS. 1 to 3, in order to simplify the illustrations, it is shown that only one-sided MOS transistor gates of transfer gates 32-1 to 32-7, 32-9 to 32-12, 42, 52 to 54 are provided with signals. However, other sided MOS transistor gates are provided with inverted ones of the above signals. Here, the transfer gates 32-1 to 32-7, 32-9 to 32-12, 42, 52 to 54 are formed by connecting a current path of a P channel type MOS transistor and a current path of an N channel type MOS transistor in parallel.

In this example, two kinds of column system basic pulses are used for a column operation synchronization and a column address latch. These two kinds of column system basic pulses are activated at the same timing.

FIGS. 4 and 5 are timing charts for showing signal waveforms of the CL2 and the CL3 schematically. FIG. 4 shows a signal waveform in the case that the CL2, i.e., the CAS latency is 2 and FIG. 5 shows a signal waveform in the case that the CL3, i.e., the CAS latency is 3, respectively.

As shown in FIG. 1, the external clock input buffer 11 is connected to two pulse generators 12-1 and 13-1. As shown in the timing chart of FIG. 4, respective pulse generators 12-1 and 13-1 generate pulse signals Pa and Pb, which have different pulse widths each other, from leading edges of an external clock VCLK. These respective pulse generators 12-1 and 13-1 are connected to pulse generators 12-2 and 13-2 via delay circuits 14-1 and 14-2, which are composed identically, respectively. These pulse generators 12-2 and 13-2 generate pulse signals Pa' and Pb' from edges of the above pulse signals Pa and Pb, respectively. The pulse generators 12-1, 13-1 and 12-2, 13-2 are identically composed. The pulse signals Pa', Pb' are obtained by shifting the pulse signals Pa, Pb for a certain period of time, respectively. In the present example, as described later, it is assumed that the pulse signals Pb, Pb' are used for the column operation synchronous pules and the pulse signals Pa, Pa' are mainly used for the column address latch pulse.

If the column access information is inputted from a command pin, a decoder 18 is connected to the CAS input buffer 15, the RAS input buffer 16 and the CS input buffer 17, respectively, to decode these signals and generate a column system activated signal Pc. Further, the decoder and the latch circuit 19 is connected to the WE input buffer 20 in addition to the CAS input buffer 15, the RAS input buffer 16 and the CS input buffer 17. If the inputted command is write, the decoder and the latch circuit 19 activates a write enable signal Pe. If the inputted command is read, it activates a read enable signal Pf, respectively.

When the column system activated signal Pc is activated, the input column address latch controller 21 outputs a column address entry pulse Pd. This pulse Pd opens the transfer gates 32-6 and 32-7. Therefore, the address information of the address input buffers 22-1 and 22-2 are transferred to the address latches 23-1 and 23-2 in a column address counter 39, so that addresses K1 and K2 of the core buses 24-1 and 24-2 are decided.

On the other hand, activation of the column system activated signal Pc allows the burst length counter 25 to be activated. The pulse signal Pb counts up the activated burst length counter 25 by number of times corresponding to the burst length. During this time, the activated burst length counter 25 is activating a burst operation activated signal Pg.

As understood from the circuit construction shown in FIG. 3, in the case that the CAS latency is 2(CL2), the column pulse transfer controller 26 activates a column pulse transfer signal Pj soon after the burst operation activated signal Pg is activated. This column pulse transfer signal Pj opens the transfer gates 32-3 and 32-4 to transfer the pulse signal Pa' to the column bank controller 27 as a column operation synchronous pulse Pp and transfer the pulse signal Pb' to the address latches 23-1 and 23-2 in a column address counter 39 as a column address latch pulse Pq. At this time, by the inverter 35, a inverted signal of the above column address latch pulse Pq is also transferred to the address latches 23-1 and 23-2.

In the present example, there is a margin in the activating timing of the column pulse transfer signal Pj with respect to the timing for activating these pulse signals Pa' and Pb'. Therefore, finding a logical OR of the column system activated signal Pc and the burst operation activated signal Pg, the column pulse transfer signal Pj is generated.

Using the column operation synchronous pulse Pp as a trigger, the column bank controller 27 generates a write pulse Pl when the write enable signal Pe is active and generates a read pulse Pm when the read enable signal Pf is active. The write pulse Pl opens a write gate of the DQ buffer 28 in a memory cell portion MCA. As a result, it becomes possible to write into the memory cell allay 34. Further, the read pulse Pm opens a read gate of the above DQ buffer 28 to output a cell data Pn to the data line 29. The cell data Pn of the above data line 29 is transferred to the off chip driver 30. After inputting a command, if the external clock VCLK at second cycles becomes active, the output pulse generator 31 outputs an output pulse Po by using the activated external clock VCLK as a trigger. This output pulse Po opens the transfer gate 32-5, which is arranged on the output terminal of the off chip driver 30. Then, an output data Dout is outputted to catch up with the external clock VCLK at third cycles.

On the other hand, while the column address latch pulse Pq, which is activated at the same time as the column operation synchronous pulse Pp, has been generated, the transfer gates 32-10 and 32-12 as backward registers are closed. The transfer gates 32-10 and 32-12 are located within the address latches 23-1 and 23-2 in the column address counter 39. During read and write operation to the memory cell portion MCA as the column operation synchronous pulse Pp as a trigger, the core bus addresses K1 and K2 are latched. The column operation synchronous pulse Pp is generated at the same time as the column address latch pulse Pq. Further, at the same time, the transfer gates 32-9 and 32-11 as forward registers are opened and the address information at a single digit before is recorded in this register. Hereby, the information of the address latch 23-1 is transferred to the address latch 23-2. If the pulse Pq is deactivated, the transfer gates 32-10 and 32-12 as the backward registers are opened to output the recorded address information at a single digit before to the core buses 24-1 and 24-2.

In the case of CL3, as understandably from the timing chart in FIG. 5, the burst operation activated signal Pg turns to a column pulse transfer signal Ph with being delayed by one cycle by the pulse signal Pb at the register within the column pulse transfer controller 26. In other words, the pulse signals Pa and Pb are transferred as the column operation synchronous pulse Pp and the column address latch pulse Pq with being delayed from the command input by one cycle, so that the access to the memory cell portion MCA is also delayed from the command input by one cycle and the date is outputted to catch up with the external clock VCLK at fourth cycle.

Next, the case that the write command is interrupted during the read operation of the CL2 and the CL3 is considered. As shown in FIG. 4, in the case of the CL2, upon inputting the write command, latches of the core bus addresses K1 and K2 due to the column address latch pulse Pq are released. Accordingly, the latching of the address is the same as that upon normal input of commands. On the contrary, in the case of the CL3, as shown in FIG. 5, when the write command is inputted, the core bus addresses K1 and K2 are latched in response to the column address latch pulse Pq. Therefore, the addresses ADD1 and ADD2 are latched from the address input buffers 22-1 and 22-1 to be held in the address latches 23-1 and 23-3 within the counter at once. Then, after the column address latch pulse Pq is inactive, the addresses ADD1 and ADD2 are outputted to the core buses 24-1 and 24-2.

As described above, using the same column operation synchronous pulse in read and write, there is a merit such that a system for latching the address when the column command interrupts during the column burst operation.

In the mean time, in the above described conventional synchronous DRAM, as shown in FIGS. 6 and 7, after the completion of the write burst, the case that a precharge command is inputted at the next cycle. FIG. 6 is a timing chart illustrating the operation in the case that the CAS latency is 2(CL2) and FIG. 7 is a timing chart illustrating the operation in the case that the CAS latency is 3(CL3). Here, a time from writing by the write pulse Pm to resetting of the word line WL is determined as tWR. The time from input of the precharge command to the word line reset is not changed in the CL2 and the CL3. On the other hand, the timing of the column operation synchronous pulse is uniquely determined by the CAS latency, which is important for determining a timing of the read operation. In other words, even when the column command is read or write, in the column operation synchronous pulse, the CL3 is delayed than the CL2. Therefore, if the CAS latency is 3 (CL3), tWR is smaller than in the case where the CAS latency is 2 (CL2). Consequently, a word line WL is reset before the data is completely written into a memory cell immediately before precharging.

BRIEF SUMMARY OF THE INVENTION

An object of the present invention is to provide a semiconductor memory, which is capable of sufficiently securing an operational margin of a column system circuit.

The object of the present invention is attained by a semiconductor memory for synchronizing at least a part of input of a command and write or read of data with an external clock and generating a column operation synchronous pulse having the same number as that of a burst length within the semiconductor memory by using an internal operation synchronous pulse having the external clock as a trigger and after inputting a column system command, using the internal operation synchronous pulse as a trigger comprising a first path to which a first column operation synchronous pulse is transferred during read; a second path to which a second column operation synchronous pulse, which is different from the first column operation synchronous pulse, is transferred during write; and a switching circuit for selectively switching the first path and the second path.

Further, the object of the present invention is attained by a semiconductor memory for synchronizing input of a command and write or read of data with an external clock and generating a column operation synchronous pulse having the same number as that of a burst length within the semiconductor memory by using an internal operation synchronous pulse having the external clock as a trigger and after inputting a column system command, using the internal operation synchronous pulse as a trigger comprising a first pulse generator for generating a first column operation synchronous pulse for read within a chip with an external clock as a trigger; a second pulse generator for generating a second column operation synchronous pulse for read within a chip with the external clock as a trigger; a first signal line provided with a first column operation synchronous pulse for read to be outputted from the first pulse generator during read; a second signal line provided with a second column operation synchronous pulse for write to be outputted from the second pulse generator during read; and a column pulse transfer controller for controlling transfer of a first column operation synchronous pulse from the first pulse generator to the first signal line and transfer of a second column operation synchronous pulse from the second pulse generator to the second signal line, respectively.

Still further, the object of the present invention is attained by a synchronous DRAM comprising a first pulse generator for generating a first column operation synchronous pulse for read within a chip with an external clock as a trigger; a second pulse generator for generating a second column operation synchronous pulse for read within a chip with the external clock as a trigger; a first signal line provided with a first column operation synchronous pulse for read to be outputted from the first pulse generator during read; a second signal line provided with a second column operation synchronous pulse for write to be outputted from the second pulse generator during read; a first transfer gate to be arranged between the first pulse generator and the first signal line; a second transfer gate to be arranged between the second pulse generator and the second signal line; and a column pulse transfer controller for controlling the first and second transfer gate and controlling transfer of a first column operation synchronous pulse from the first pulse generator to the first signal line and transfer of a second column operation synchronous pulse from the second pulse generator to the second signal line, respectively.

In the semiconductor memory of the present invention, which has the above configurations, the timing of a synchronous pulse can be adjusted in conformity to a limiting factor to secure sufficiently an operational margin of a column system circuit, since a column operation synchronous pulses, which are different between read and write, is used. Hence, if the CAS latency is 3, tWR is smaller than in the case where the CAS latency is 2. Consequently, so that a problem such that a word line is reset before the data is completely written into a memory cell immediately before precharging is avoided.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 2:
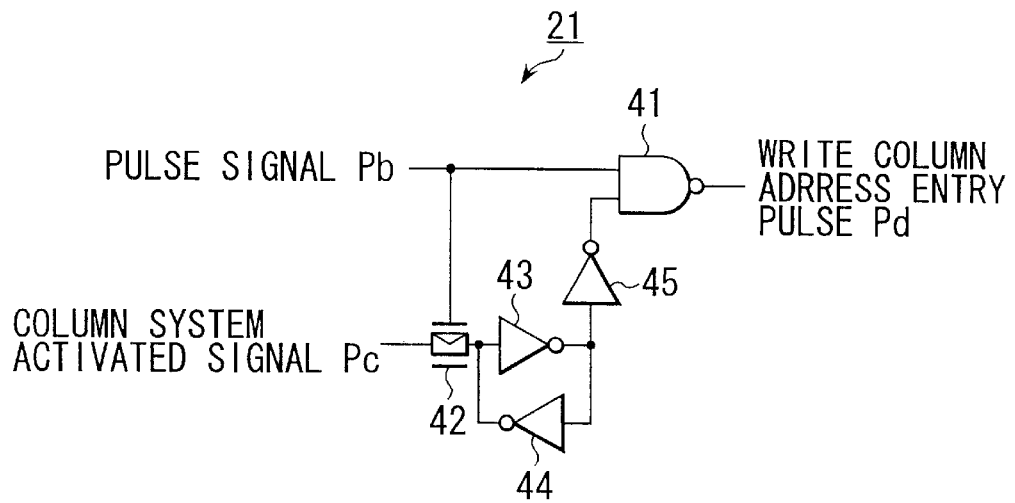
FIG. 2 is a circuit diagram showing a constitutional example of an input column address latch controller in the circuit shown in FIG. 1 to explain with respect to a conventional semiconductor memory.
Figure 3:
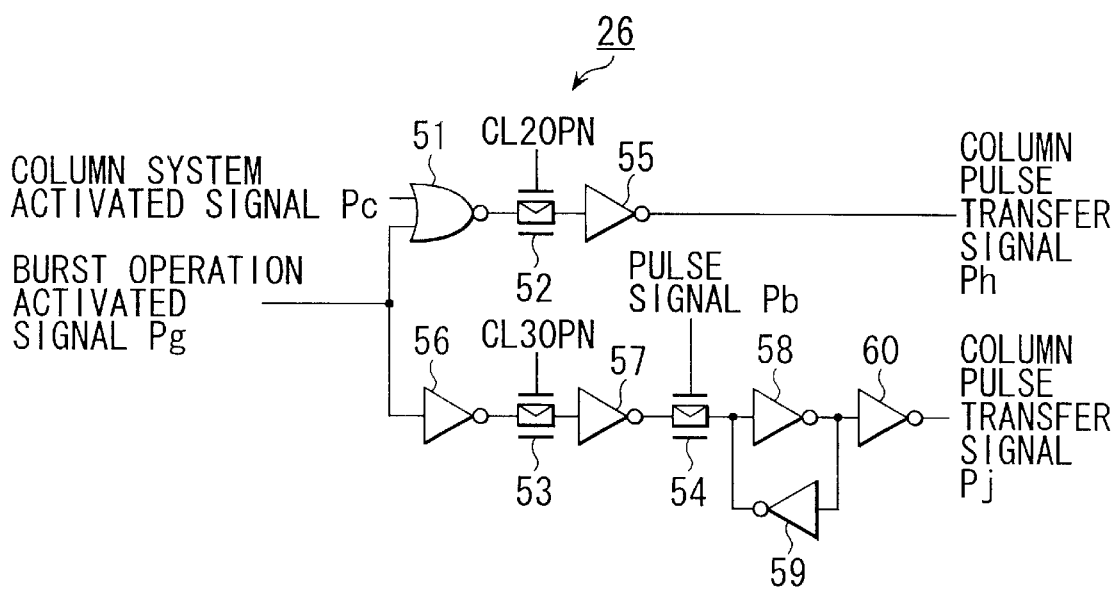
FIG. 3 is a circuit diagram showing a column pulse transfer controller in the circuit shown in FIG. 1 to explain with respect to a conventional semiconductor memory.
Figure 4:
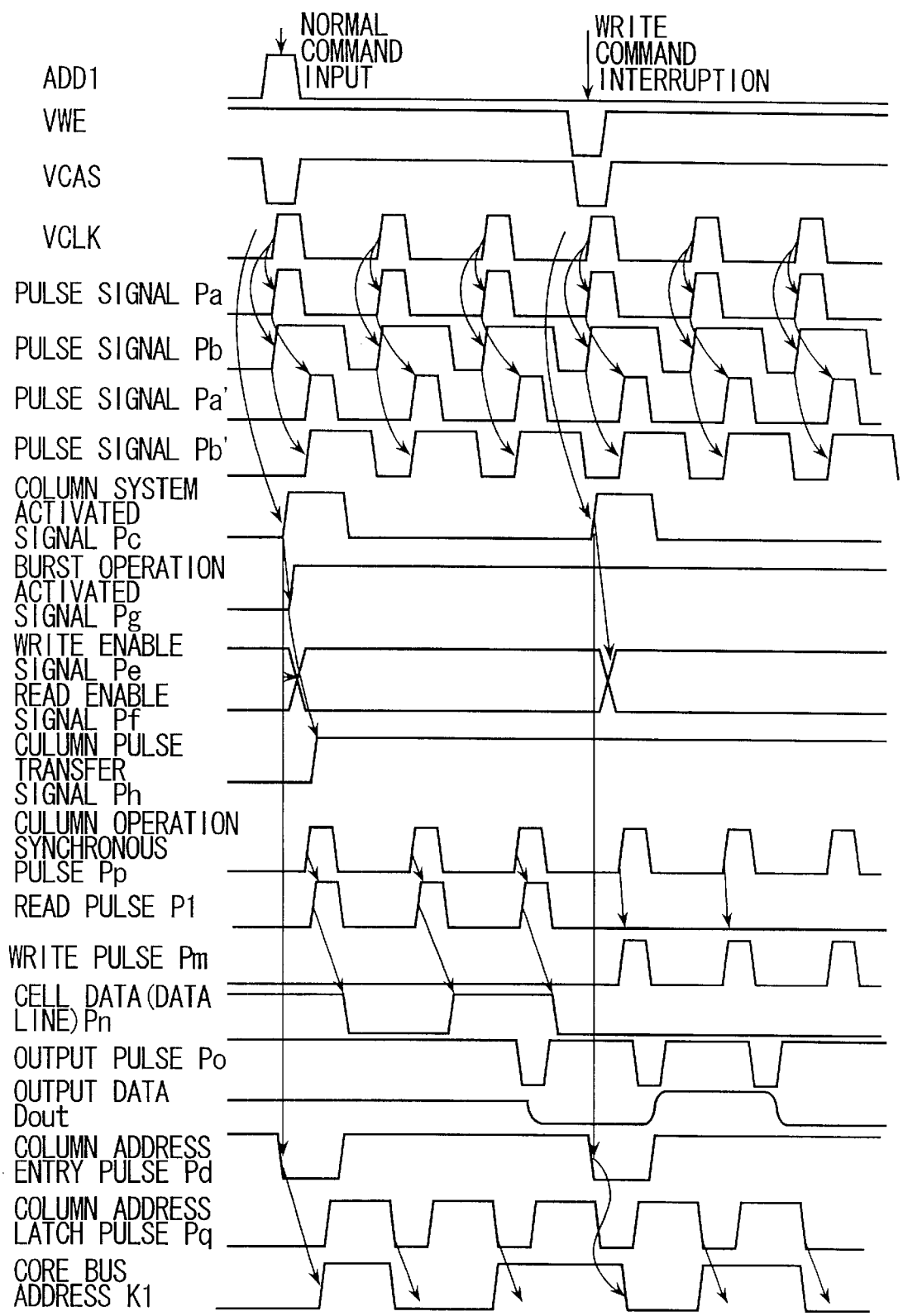
FIG. 4 is a timing chart showing respective signal waveforms typically in the case that the CAS latency is 2 in the semiconductor memory shown in FIGS. 1 to 3.
Figure 5:
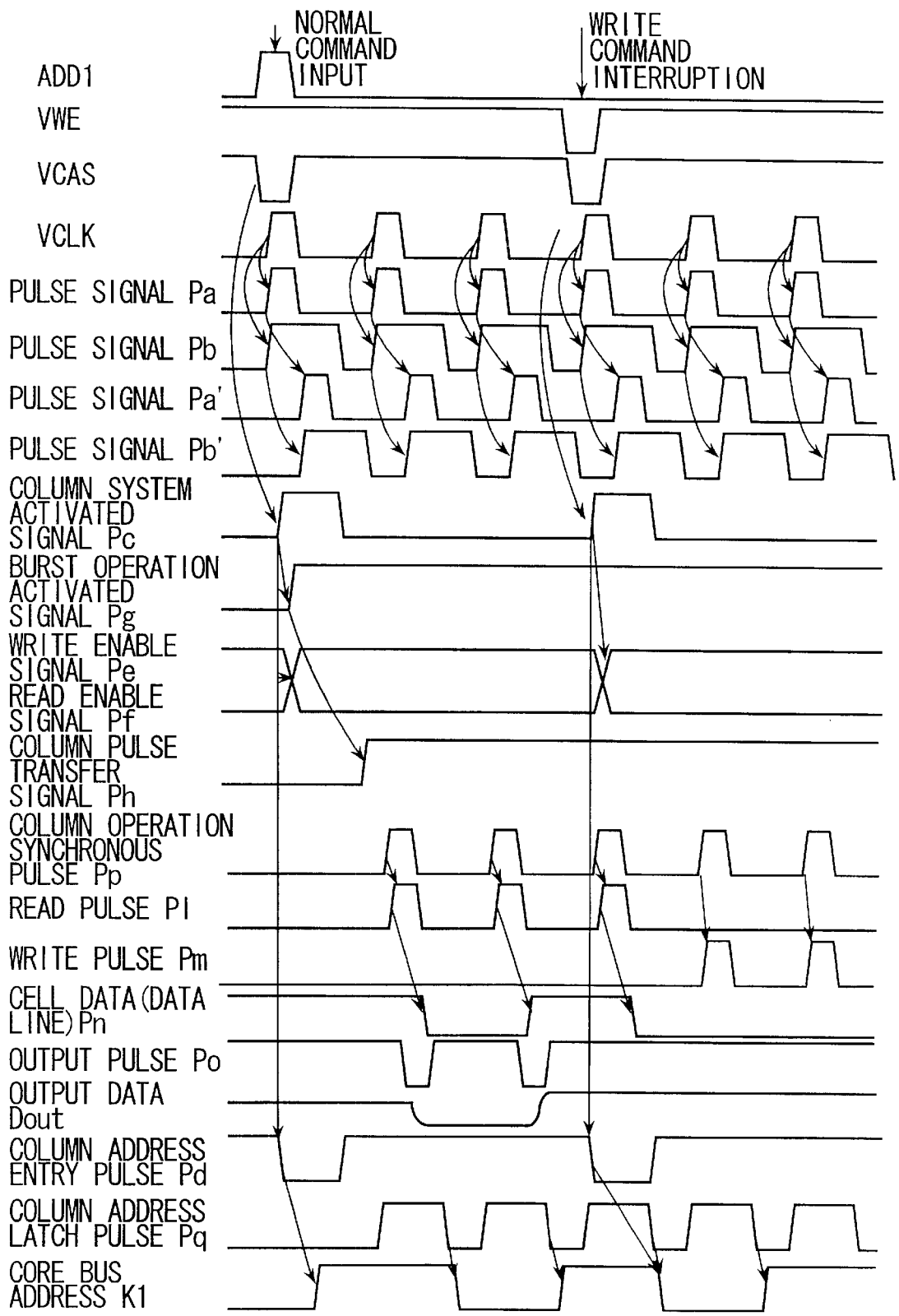
FIG. 5 is a timing chart showing respective signal waveforms typically in the case that the CAS latency is 3 in the semiconductor memory shown in FIGS. 1 to 3.
Figure 6:
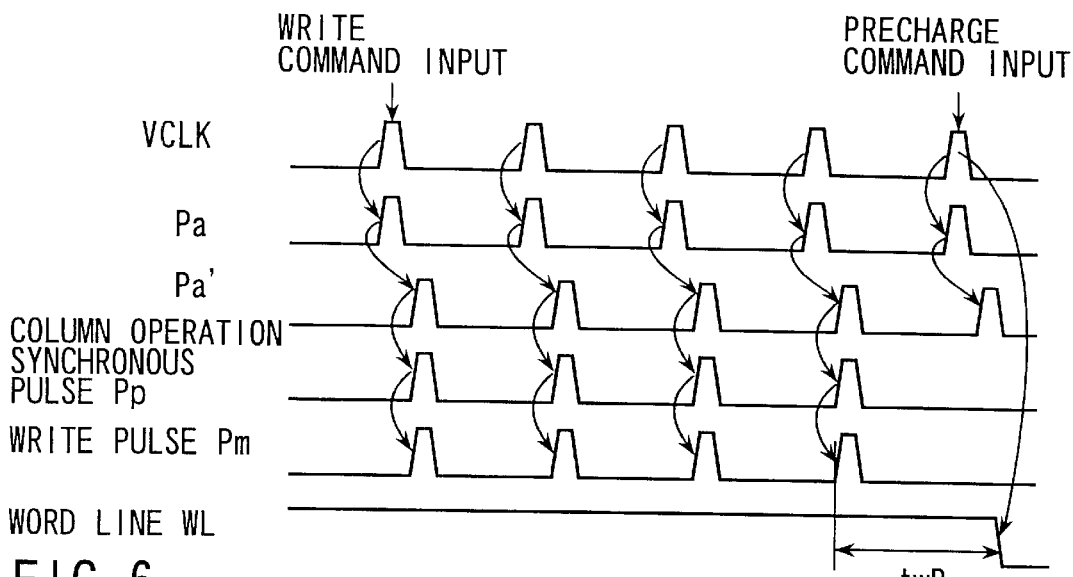
FIG. 6 is a timing chart illustrating the operation in the case that the CAS latency is 2.
Figure 7:
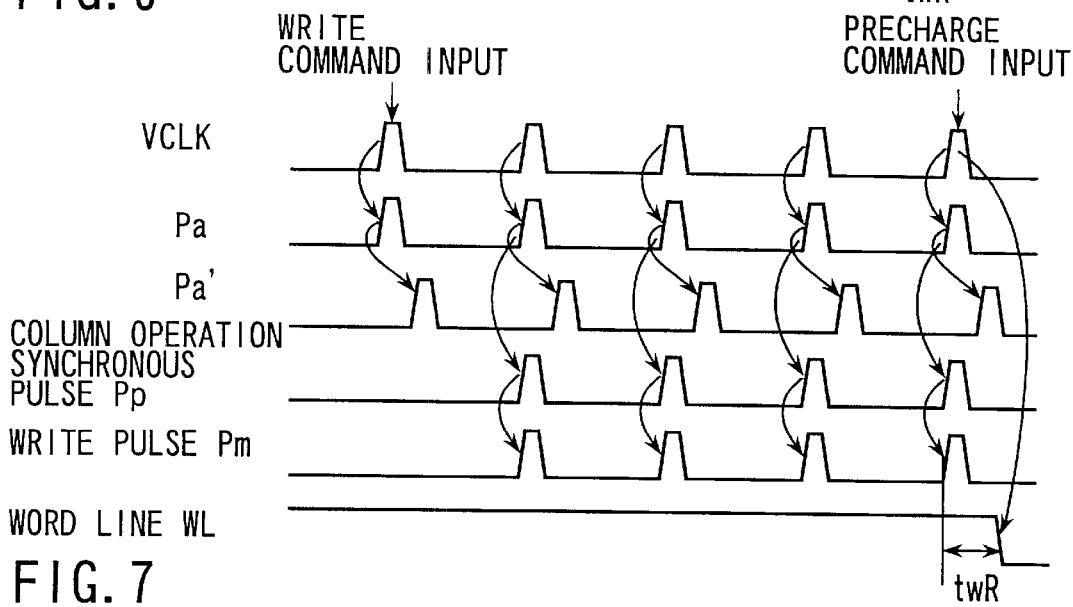
FIG. 7 is a timing chart illustrating the operation in the case that the CAS latency is 3.
Figure 10:
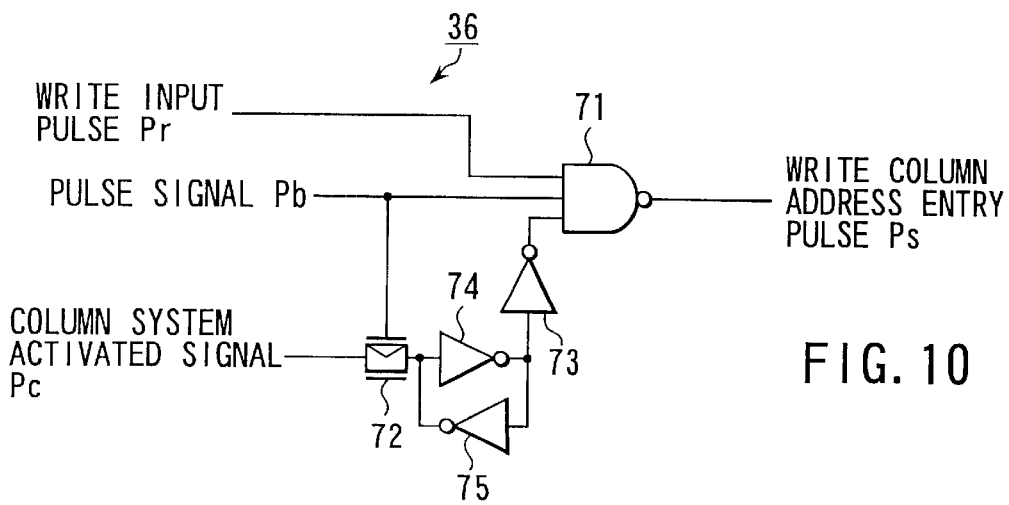
FIG. 10 is a circuit diagram showing a constitutional example of an input write address latch controller in the circuit shown in FIG. 9 to explain with respect to a first embodiment of the present invention.
Figure 8:
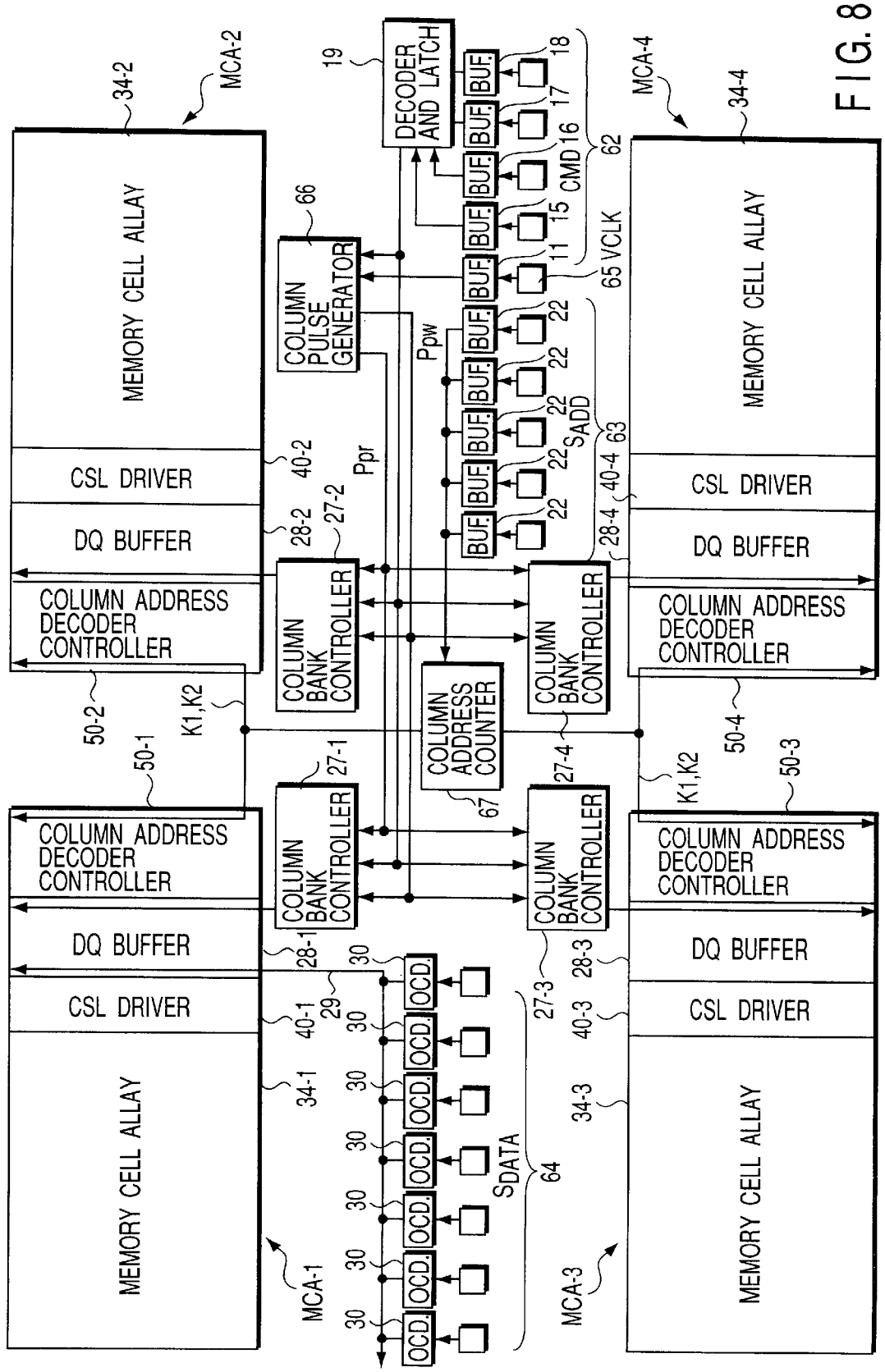
FIG. 8 is a block diagram showing a construction of a synchronous DRAM schematically to explain with respect to a semiconductor memory according to a first embodiment of the present invention.
Figure 9:
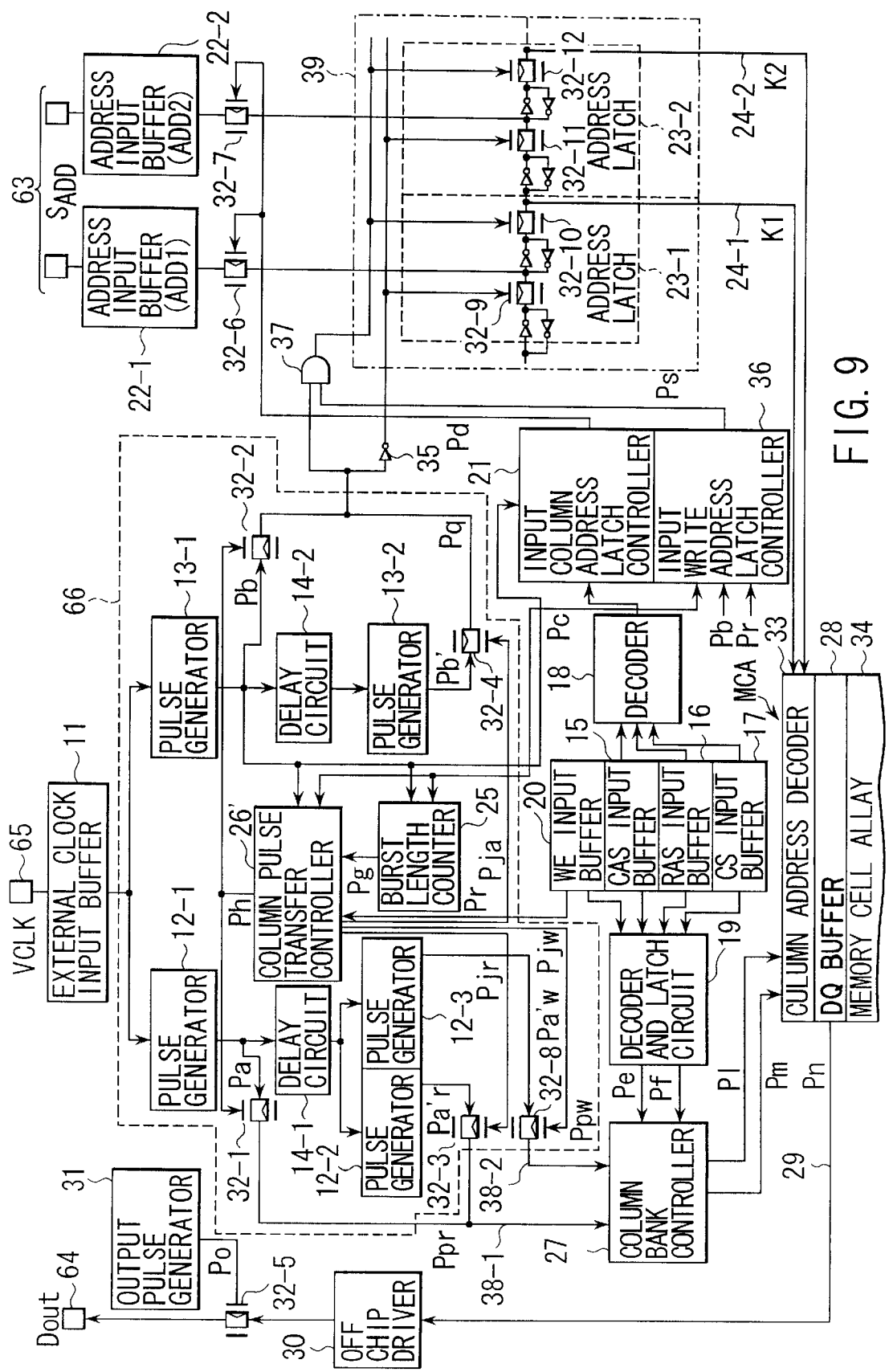
FIG. 9 is a block diagram showing extractively a circuit in reference to the control of a column system basic pulse in a synchronous DRAM to explain with respect to a semiconductor memory according to a first embodiment of the present invention.
Figure 11:
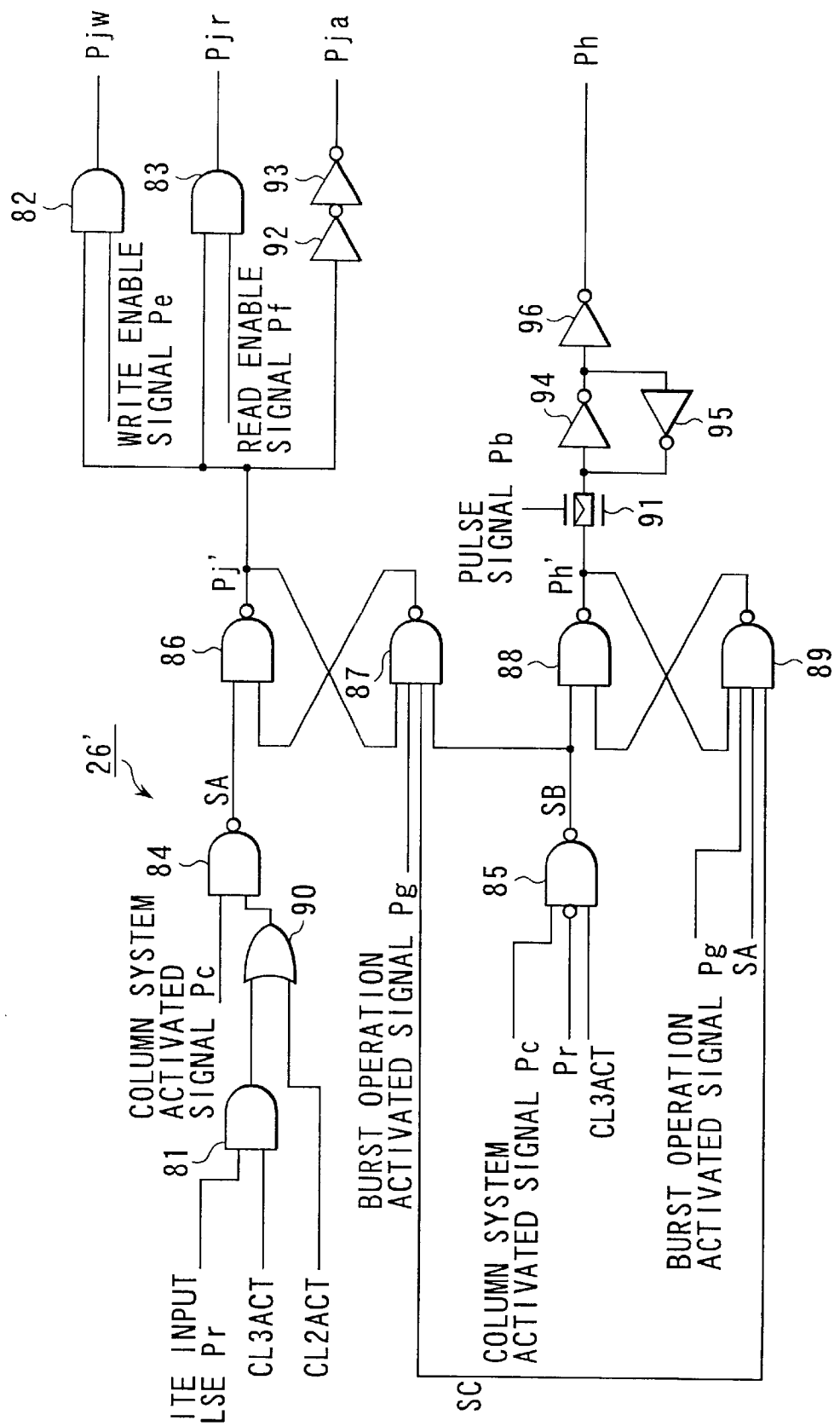
FIG. 11 is a circuit diagram showing a constitutional example of a column pulse transfer controller in the circuit shown in FIG. 9 to explain with respect to a first embodiment of the present invention.

FIGS. 8 to 11 illustrate a semiconductor memory according to a first embodiment of the present invention, respectively. FIG. 8 is a block diagram schematically showing a construction of a synchronous DRAM. FIG. 9 is a block diagram showing extractively a circuit in reference to the control of a column system basic pulse in this synchronous DRAM. FIG. 10 is a circuit diagram showing a constitutional example of an input write address latch controller in the circuit shown in FIG. 9. FIG. 11 is a circuit diagram showing a constitutional example of a column pulse transfer controller in the circuit shown in FIG. 9. In FIGS. 8 to 11, the identical reference numerals are given to the elements, which correspond to the elements in FIGS. 1 to 3.

As shown in FIG. 8, the memory cell allay in this synchronous DRAM is divided into four banks, namely, banks MCA-1 to MCA-4. Respective banks MCA-1 to MCA-4 are composed of memory cell allays 34-1 to 34-4, CSL drivers 40-1 to 40-4, DQ buffers 28-1 to 28-4, and circuit blocks 50-1 to 50-4 each having column address decoder and controller or the like, respectively.

Further, corresponding to the above respective banks MCA-1 to MCA-4, column bank controllers 27-1 to 27-4 are provided, respectively. The column bank controllers 27-1 to 27-4 controlled DQ buffers 28-1 to 28-4 provided in the banks MCA-1 to MCA-4. Commands CMD are inputted to CAS input buffer 15, RAS input buffer 16, CS input buffer 17 and WE input buffer 20 via command pads 62. A decoder and latch 19 is connected to the input buffers 15, 16, 17 and 20, and latching and decoding the commands CMD. The decoder and latch 19 controlling the each column bank controllers 27-1 to 27-4. Address signals $S_{ADD}$ are inputted to column address counter 39 via address pads 63 and address input buffers 22. Each column address decoders provided in the circuit blocks 50-1 to 50-4 connected to receive the output signals (core bus addresses K1 and K2) of the column address counter 39. The DQ buffers 28-1 to 28-4 in the above respective banks MCA-1 to MCA-4 are intended to be inputted with a data $S_{DATA}$ from a data input/output pads 64 via data lines 29, respectively or the data outputted from the DQ buffers 28-1 to 28-4 are intended to be outputted to the outside via the data lines 29, off chip drivers (OCD.) 30 and the data input/output pads 64. Further external clock VCLK inputted in the clock input pad 65 supplied with column pulse generator 66 via an external input buffer 11. Each column bank controllers 27-1 to 27-4 connected to receive column operation synchronous pulses Ppr and Ppw generated by the column pulse generator 66.

As shown in FIG. 9, the circuit in reference to the control of the column system basic pulse in a synchronous DRAM is composed of the external clock input buffer 11, pulse generators 12-1, 12-2, 12-3, 13-1 and 13-2, delay circuits 14-1, 14-2, the CAS input buffer 15, the RAS input buffer 16, the CS input buffer 17, a decoder 18, the decoder and latch circuit 19, the WE input buffer 20, an input column address latch controller 21, address input buffers 22-1, 22-2, address latches 23-1, 23-2, core buses 24-1, 24-2 (addresses K1, K2), a burst length counter 25, a column pulse transfer controller 26', the column bank controller 27, the DQ buffer 28, a data line 29, an off chip driver 30, an output pulse generator 31, transfer gates 32-1 to 32-8, a column address decoder 33, the memory cell allay 34, an inverter 35, an input write address latch controller 36, an AND gate 37 and signal lines 38-1, 38-2 or the like.

Figure 1:
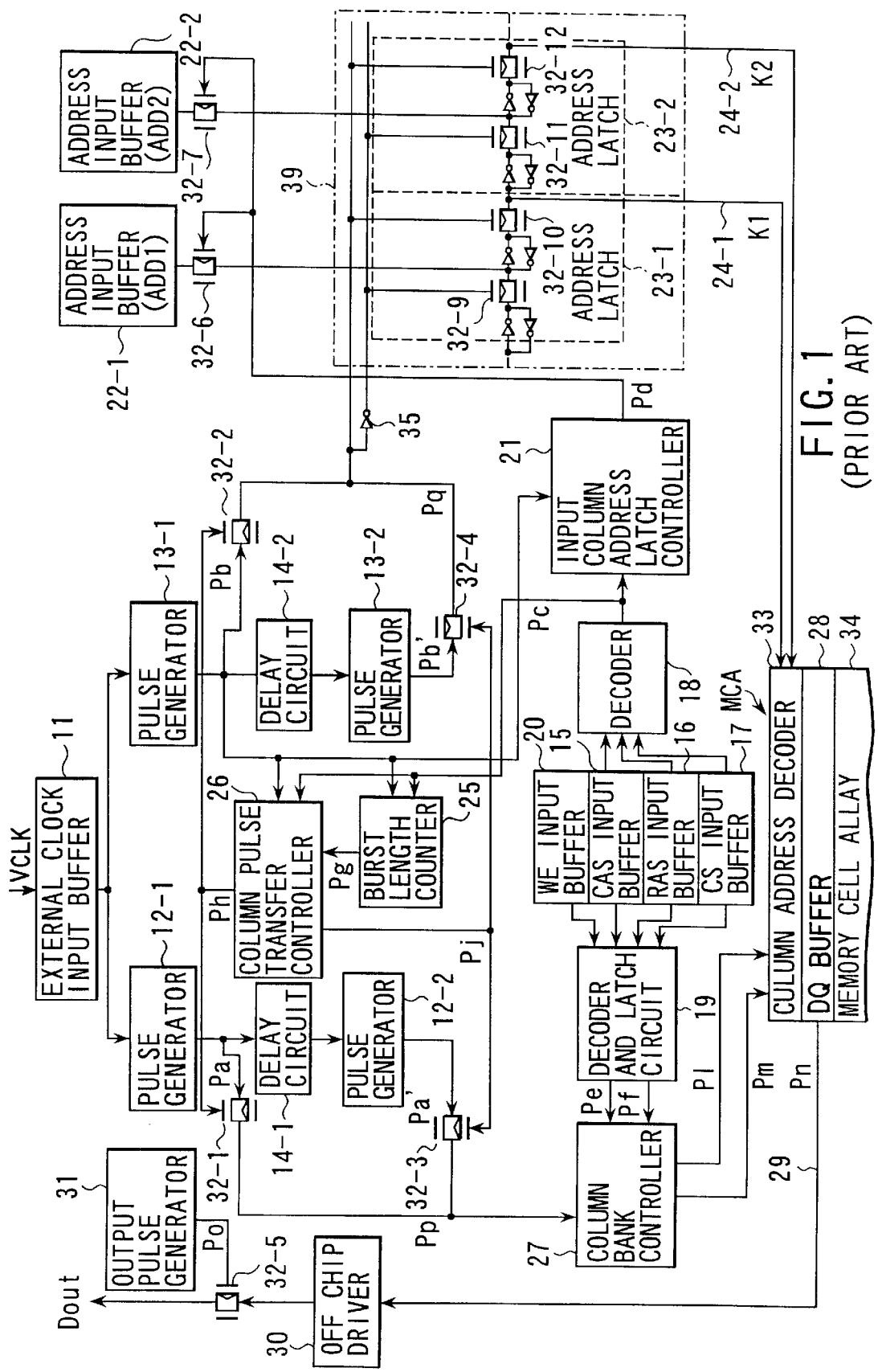
FIG. 1 is a block diagram showing extractively a circuit in reference to the control of a column system basic pulse in a synchronous DRAM to explain with respect to a conventional semiconductor memory.

The circuit shown in FIG. 9 is composed of a pulse generator 12-3, a transfer gate 32-8, a signal line 38-1 for transferring a column operation synchronous pulse Ppr for read, a signal line 38-2 for transferring a column operation synchronous pulse Ppw for write, an input write address latch controller 36 and an AND gate 37 or the like in addition to the conventional circuit shown in FIG. 1.

In other words, according to the present invention, the column operation synchronous pulse (internal operation synchronous pulse) into a write only pulse and a read only pulse. In this embodiment, an example of a method using different column operation synchronous pulse in a read operation and a write operation, respectively, despite of CAS latency (CL), a write operation is performed at a conventional timing that the CAS latency is 2(CL2).

The above pulse generator 12-3 is connected to the delay circuit 14-1 in parallel with the pulse generator 12-2. This pulse generator 12-3 generates a pulse signal Pa'w to be activated by the same timing as that of the pulse signal Pa'. The pulse signal Pa is transferred to the signal line 38-1 as a column operation synchronous pulse Ppr for read in response to the column pulse transfer signal Ph generated by the column pulse transfer controller 26' during a read operation when the CAS latency is 3(CL3). The pulse signal Pa'w generated by the pulse generator 12-3 is transferred to the signal line 38-2 as a column operation synchronous pulse Ppw for write in response to the transfer signal Pjw despite of the CAS latency. Further, a pulse signal Pa'r is transferred to the signal line 38-1 as a column operation synchronous pulse Ppr for read by a read column pulse transfer signal Pjr when the CAS latency is 2(CL2). The pulse Pa'w is transferred to the signal line 38-2 as the column operation synchronous pulse Ppw for write by the transfer signal Pjw to be generated by the column pulse transfer controller 26' during a write operation.

Further, the column pulse transfer controller 26' is provided with a write input pulse Pr to be outputted from the WE input buffer 20, a write enable signal Pe and a read enable signal Pf in addition to the pulse signal Pb to be outputted from the above pulse generator 13-1, the column system activated signal Pc to be outputted form the above decoder 18 and the burst operation activated signal Pg to be outputted from the above burst length counter 25. Further, the column pulse transfer controller 26' is intended to output the pulse signal Ph for controlling the above transfer gates 32-1 and 32-2, a column pulse transfer signal Pjr for read for controlling the above transfer gate 32-3, a column pulse transfer signal Pjw for write for controlling the above transfer gate 32-8 and a column pulse transfer signal Pja for controlling the above transfer gate 32-4.

As shown in FIG. 10, the above input write address latch controller 36 is comprised of a NAND gate 71, a transfer gate 72 and inverters 73, 74 and 75. A write column address entry pulse Ps is outputted from the input write address latch controller 36 to be provided to one input terminals of the AND gate 37. Then, the write column address entry pulse Ps releases latches of the core bus addresses K1 and K2 in the address latches 23-1 and 23-2 by the column address latch pulse Pq.

Further, as shown in FIG. 11, the above column pulse transfer controller 26' is composed of AND gates 81 to 83, NAND gates 84 to 89, an OR gate 90, a transfer gate 91 and inverters 92 to 96. This column pulse transfer controller 26' basically comprises two flip-flop latch circuits. Upon inputting the column command at the CL2 or inputting a write command at the CL3, the above flip-flop latch circuit activates an output signal Pj' of the NAND gate 86 from the column system activated signal Pc to latch the activated output signal Pj' with the burst operation activated signal Pg. When the burst operation is completed, the latch is released with the signal SC and the output signal Pj' of the NAND gate 86 is deactivated. The above signal SC is a negative pulse to be generated at completion of the burst operation. Here, the explanation thereof is omitted. During the read operation, a signal Pjr is generated from the output signal Pj' of the NAND gate 86 and during the write operation, the transfer signal Pjw is generated from the output signal Pj' of the NAND gate 86. During write and read operation, a signal Pja is generated from the output signal Pj' of the NAND gate 86. On the other hand, the flip-flop circuit at the lower column activates the output the pulse signal Ph' of the NAND gate 88 from the column system activated signal Pc upon inputting the read command at the CL3 to latch the activated output signal Ph' with the burst operation activated signal Pg. When the transfer gate 91 is opened due to deactivation of the pulse signal Pb, the signal Ph' is changed into the signal Ph at one cycle's delay. Further, in the CL3, as well as in the CL2, after the burst operation is completed, the latch is released by the signal SC and the output signal Ph' is deactivated. In this state, the transfer gate 91 is opened by deactivation of the pulse signal Pb, so that the column pulse transfer signal Ph is deactivated at one cycle's delay.

The above column pulse transfer controller 26' has a system such that the latch of the output signal Ph' of the NAND gate 88 is released by the signal SA and the latch of the output signal Pj' of the NAND gate 86 is released. When the read interrupts during the write burst at the CL3 or when the write interrupts during the read burst at the CL3, the column pulse transfer controller 26' is capable of switching the output signal Ph' of the NAND gate 88 to the output signal Pj' of the NAND gate 86.

In FIGS. 9 to 11, in order to simplify the illustrations, it is shown that only one sided MOS transistor gates of transfer gates 32-1 to 32-8, 72, 91 are provided with signals. However, other sided MOS transistor gates are provided with inverted ones of the above signals. Further, the CL2ACT and the CL3ACT in FIG. 11 are signals to be activated at the CL2 and the CL3, respectively.

Next, with reference to a timing chart in FIG. 12, the operation of the synchronous DRAM having the above described construction is explained below.

Figure 12:
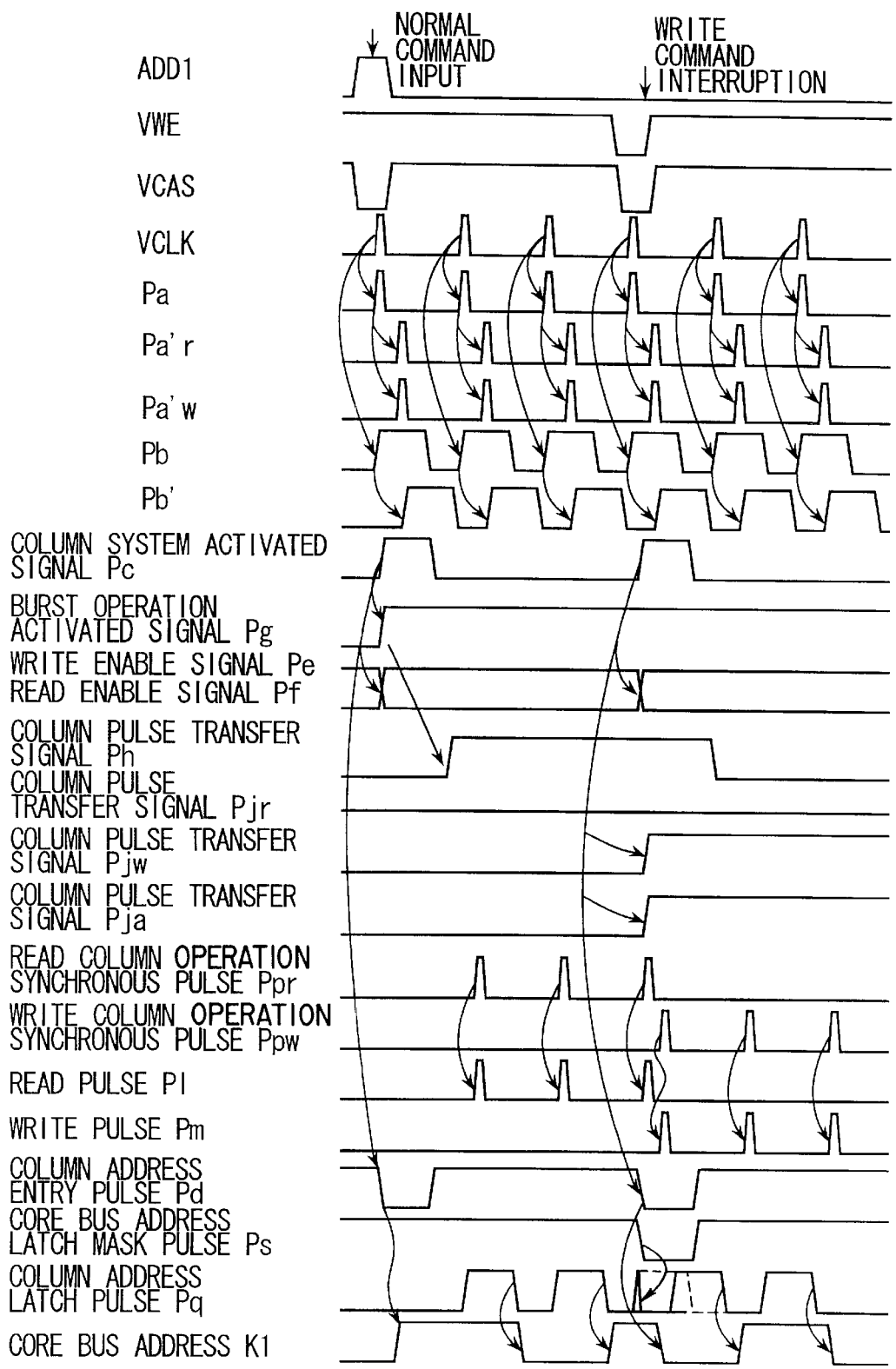
FIG. 12 is a timing chart showing respective signal waveforms typically in the case that a write command interrupts during the read operation when the CAS latency is 3 in the semiconductor memory shown in FIGS. 9 to 11.

FIG. 12 is the timing chart showing the write interruption during the read burst operation at the CL3. Using the above described column synchronous pulse system, during the write interruption during the read burst at the CL3, the address informations ADD1 and ADD2 in the address input buffers 22-1 and 22-2 are latched, so that the latches of the address latches 23-1 and 23-2 of the core buses 24-1 and 24-2 should be released.

In the present embodiment, only upon inputting the write command, the core bus address latch mask pulse Psis activated at the same time of the column address entry pulse Pd. Then, the activated core bus address latch mask pulse Ps masks the column address latch pulse Pq to output the addresses ADD1 and ADD2 to the core buses 24-1 and 24-2. The above pulse Ps is generated by the input write address latch controller 36 (see FIG. 10). This controller 36 is composed of the write input pulse Pr in addition to the input signal of the input column address latch controller 21 for generating the column address entry pulse Pd. The logic configurations of the input write address latch controller 36 and the input column address latch controller 21 are substantially identical and they are activated at the approximately same timing. Therefore, at the same time that the input write address latch controller 36 opens the transfer gates 32-10 and 32-12 and entries the addresses ADD1 and ADD2, the latch state of the address latches 23-1 and 23-2 are released. As a result, the entry addresses ADD1 and ADD2 are transferred to the core buses 24-1 and 24-2 at the same timing as that of a normal command input.

According to the above configurations, since a column operation synchronous pulses, which are different between read and write, is used, the semiconductor memory of the present invention is capable of adjusting a timing of a synchronous pulse in conformity to a limiting factor to secure sufficiently an operational margin of a column system circuit. Thus, in the case that the CAS latency is 3, tWR is smaller compared with the case that the CAS latency is 2, so that a problem such that a word line is reset in the course that writing into a memory cell just before precharging is not sufficient is avoided.

Figure 13:
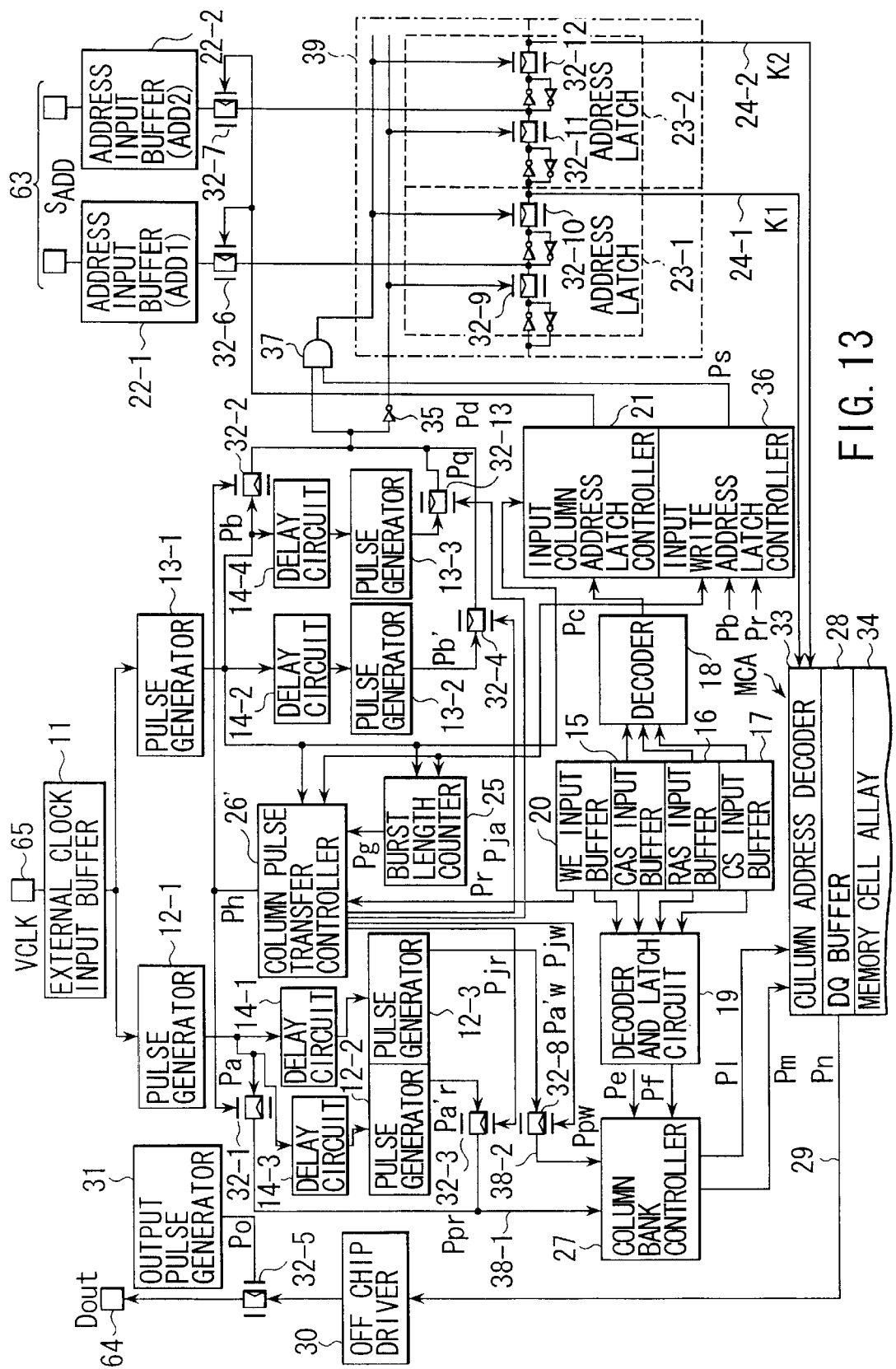
FIG. 13 is a block diagram showing extractively a circuit in reference to the control of a column system basic pulse in a synchronous DRAM to explain with respect to a semiconductor memory according to a second embodiment of the present invention.

FIG. 13 is a block diagram showing extractively a circuit in reference to the control of a column system basic pulse in a synchronous DRAM to explain with respect to a semiconductor memory according to a second embodiment of the present invention. According to the above first embodiment, the output signal of the delay circuit 14-1 is provided to the pulse generators 12-2 and 12-3. On the contrary, according to the present embodiment, the delay circuit 14-3 is further arranged and the output signal of this delay circuit 14-3 is provided to the pulse generator 12-2 so that the output signal of the above delay circuit 14-1 is provided to the pulse generator 12-3. In addition, the delay circuit 14-4, the pulse generator 13-3 and the transfer gate 32-13 are further arranged.

According to the above construction, the same operation as that of the circuit shown in FIG. 9 is performed to basically obtain the same effect as that of the circuit shown in FIG. 9.

As explained above, according to the present invention, a semiconductor memory such that the operational margin of the column system circuit can be sufficiently secured.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A semiconductor memory for synchronizing at least one input command, writing or reading data with an external clock, generating a column operation synchronous pulse having the same number as that of a burst length within the semiconductor memory by using an internal operation synchronous pulse having the external clock as a trigger, and after inputting a column system command, using said internal operation synchronous pulse as a trigger comprising:
   a first path to which a first column operation synchronous pulse is transferred during read;
   a second path to which a second column operation synchronous pulse, which is different from said first column operation synchronous pulse, is transferred during write;
   a switching circuit for selectively switching said first path and said second path; and
   a column pulse transfer controller configured to control the switching circuit for selecting the first path or the second path.

2. The semiconductor memory according to claim 1, wherein n≠m when a first cycle starting from said internal operation synchronous pulse in a column command input cycle to said first column operation synchronous pulse is represented as an n-cycle and a second cycle starting from said internal operation synchronous pulse in said column command input cycle to said second column operation synchronous pulse is represented as an m-cycle.

3. The semiconductor memory according to claim 1, wherein a delay time from said internal operation synchronous pulse as a trigger to said first column operation synchronous pulse and a second delay time from said internal operation synchronous pulse as a trigger to said second column operation synchronous pulse are different.

4. The semiconductor memory according to claim 1, wherein, when a CAS latency is 2, said internal operation synchronous pulse in a column command input cycle becomes a first trigger of said first column operation synchronous pulse for read;

when a CAS latency is 3, said internal operation synchronous pulse in a next cycle of said column command input cycle becomes a first trigger of a column system synchronous pulse for read; and said second column operation synchronous pulse for write uses said internal operation synchronous pulse in said column command input cycle as a first trigger of said second column operation synchronous pulse for write despite a CAS latency.

5. The semiconductor memory according to claim 1, wherein, when a CAS latency is 2, said internal operation synchronous pulse in a column command input cycle becomes a first trigger of said first column operation synchronous pulse for read;

when a CAS latency is 3, said internal operation synchronous pulse in a next cycle of said column command input cycle becomes a first trigger of a column system synchronous pulse for read; and said second column operation synchronous pulse for write uses said internal operation synchronous pulse in a next cycle of said column command input cycle as a first trigger of said second column operation synchronous pulse for write despite of CAS latency.

6. The semiconductor memory according to claim 1, wherein, when a CAS latency is 2, said internal operation synchronous pulse in a column command input cycle becomes a first trigger of said second column operation synchronous pulse for write;

when a CAS latency is 3, said internal operation synchronous pulse in a next cycle of said column command input cycle becomes a first trigger of a column system synchronous pulse for write; and said first column operation synchronous pulse for read uses said internal operation synchronous pulse in said column command input cycle as a first trigger of said column operation synchronous pulse for read despite a CAS latency.

7. The semiconductor memory according to claim 1, wherein, when a CAS latency is 2, said internal operation synchronous pulse in a column command input cycle becomes a first trigger of said first column operation synchronous pulse for write only;

when a CAS latency is 3, said internal operation synchronous pulse in a next cycle of said column command input cycle becomes a first trigger of a column system synchronous pulse for write; and said first column operation synchronous pulse for read uses said internal operation synchronous pulse in a next column command input cycle as a first trigger of said column operation synchronous pulse for read despite a CAS latency.

8. The semiconductor memory according to claim 1, using a pulse to be active concurrently with column operation synchronous pulses for write and read only to latch internal addresses during write and read operation.

9. The semiconductor memory according to claim 8, using identical signal lines both in read and write.

10. The semiconductor memory according to claim 9, masking a pulse for latching an address upon inputting a write command and releasing a latch of said internal addresses.

11. The semiconductor memory according to claim 9, masking a pulse for latching an address upon inputting a read command and releasing a latch of said internal addresses.

12. A semiconductor memory for synchronizing input of a command and writing or reading data with an external clock and generating a column operation synchronous pulse having the same number as that of a burst length within said semiconductor memory by using an internal operation synchronous pulse having said external clock as a trigger and after inputting a column system command, using said internal operation synchronous pulse as a trigger comprising:

a first pulse generator for generating a first column operation synchronous pulse for read within a chip with said external clock as a trigger;

a second pulse generator for generating a second column operation synchronous pulse for read within said chip with said external clock as a trigger;

a first signal line provided with said first column operation synchronous pulse for read to be outputted from said first pulse generator during read;

a second signal line provided with said second column operation synchronous pulse for read to be outputted from said second pulse generator during read; and a column pulse transfer controller for controlling transfer of said first column operation synchronous pulse from said first pulse generator to said first signal line and transfer of said second column operation synchronous pulse from said second pulse generator to said second signal line, respectively.

13. The semiconductor memory according to claim 12, further comprising a first transfer gate to be controlled by said column pulse transfer controller and a second transfer gate, which is arranged between said second pulse generator and said second signal line to be controlled by said column pulse transfer controller.

14. The semiconductor memory according to claim 12, further comprising an input write address latch controller for activating a core bus address latch mask pulse at the same time as a column address latch pulse only upon inputting a write command, masking a column address latch pulse and outputting the address latched by an input buffer to said core bus.

15. A synchronous DRAM comprising:

a first pulse generator for generating a first column operation synchronous pulse for read within a chip with an external clock as a trigger;

a second pulse generator for generating a second column operation synchronous pulse for read within said chip with said external clock as a trigger;

a first signal line provided with said first column operation synchronous pulse for read to be outputted from said first pulse generator during read;

a second signal line provided with said second column operation synchronous pulse for read to be outputted from said second pulse generator during read;

a first transfer gate to be arranged between said first pulse generator and said first signal line;

a second transfer gate to be arranged between said second pulse generator and said second signal line; and a column pulse transfer controller for controlling said first and second transfer gate and controlling transfer of said first column operation synchronous pulse from said first pulse generator to said first signal line and transfer of said second column operation synchronous pulse from said second pulse generator to said second signal line, respectively.

16. The synchronous DRAM according to claim 15, further comprising a delay circuit for delaying a pulse signal to be generated from a leading edge of said external clock and providing said delayed pulse signal to said first and second pulse generators.

17. The synchronous DRAM according to claim 15, further comprising a first delay circuit for delaying a pulse signal to be generated from a leading edge of said external clock and providing said delayed pulse signal to said first pulse generator; and a second delay circuit for delaying a pulse signal to be generated from a leading edge of said external clock and providing said delayed pulse signal to said second pulse generator.

18. The synchronous DRAM according to claim 15, further comprising an input write address latch controller for activating a core bus address latch mask pulse at the same time as a column address latch pulse only upon inputting a write command, masking a column address latch pulse and outputting an address latched by an input buffer to said core bus.

* * * * *